United States Patent [19]

Staby

[11] 4,173,097
[45] Nov. 6, 1979

[54] CONTAINER WITH RAISED INDENTATIONS FOR AERATION AND DRAINAGE

[76] Inventor: George L. Staby, 1170 Slade Ave., Columbus, Ohio 43220

[21] Appl. No.: 833,055

[22] Filed: Sep. 14, 1977

[51] Int. Cl.² ............................................ A01G 9/02
[52] U.S. Cl. .......................................... 47/66; 47/79; D11/152
[58] Field of Search ................ 47/66, 79, 87, DIG. 7; D11/143, 152–156

[56] References Cited

U.S. PATENT DOCUMENTS

| D. 19,406 | 11/1889 | Whilldin | 47/66 X |
|---|---|---|---|
| D. 192,486 | 3/1962 | Lambert | D11/152 |
| D. 193,485 | 8/1962 | White | D11/152 |
| D. 243,030 | 1/1977 | Gross | D11/152 |
| D. 243,112 | 1/1977 | Gross | D11/152 |
| D. 245,683 | 9/1977 | Thomas | D11/152 |
| 650,614 | 5/1900 | Roeseler | 47/79 |
| 1,710,878 | 4/1929 | Kelso | 47/66 |
| 1,775,831 | 9/1930 | Salisbury | 47/66 |
| 2,810,234 | 10/1957 | Blackburn et al. | 47/66 |
| 3,315,410 | 4/1967 | French | 47/66 |
| 3,381,410 | 5/1968 | Potain | 47/79 |
| 3,896,587 | 7/1975 | Insalaco | 47/66 |
| 3,961,446 | 6/1976 | Mason et al. | 47/79 |

FOREIGN PATENT DOCUMENTS

| 202424 | 3/1956 | Australia | 47/66 |
|---|---|---|---|
| 629282 | 4/1936 | Fed. Rep. of Germany | 47/66 |
| 2305123 | 3/1976 | France | 47/79 |
| 373467 | 7/1939 | Italy | 47/DIG. 7 |
| 52220 | 10/1910 | Switzerland | 47/66 |
| 5224 | of 1884 | United Kingdom | 47/66 |
| 2260 | of 1889 | United Kingdom | 47/66 |
| 300 | of 1912 | United Kingdom | 47/66 |
| 859964 | 1/1961 | United Kingdom | 47/66 |

Primary Examiner—Edgar S. Burr
Assistant Examiner—Steven A. Bratlie
Attorney, Agent, or Firm—Millard, Cox & Smith

[57] ABSTRACT

This invention relates in general to improved containers for the growth of plants which provide a better environment for the plant roots, and hence improved plant growth, by providing a better balance between the water and gaseous contents of the growing media. This is achieved through the use of indentations in the bottom and/or side(s) of the container, thereby, (1) increasing the surface area of the part of the container in contact with the growing media, (2) reducing the average distance a molecule must diffuse in the growing media from roots before encountering a media-air interface (and vice versa) and (3) reducing th proportion of relatively water saturated growing media in the container.

2 Claims, 4 Drawing Figures

CONTAINER WITH RAISED INDENTATIONS FOR AERATION AND DRAINAGE

BACKGROUND OF THE INVENTION

The growth of plants in containers has been practiced since before recorded history. During the development of the art of plant growth and the sciences of horticulture, forestry, agriculture, etc., countless improvements in the culture of plants have been made. A portion of these improvements have related to improved environments for root growth and development. For example, it is now common practice to use growing media which have better balances between air filled pores and water filled pores than normally occur in a container filled with naturally occurring mineral, synthetic and/or organic media. A commonly used media that provides a good balance between media, air and water is one prepared from mixtures of aggregates such as perlite or vermiculite and peat moss, often with significant amounts of normal soil being added. Generally, these new media result in improved plant growth as evidenced by faster growth rates, improved yields, and higher quality plants.

However, while it is well recognized by those people skilled in the art that soil media used in containers must have very special properties, the mass of soil present in horticultural containers is often relatively small and shallow, and these two points create problems peculiar to this system. The smallness of the media mass means that the amount of water held is relatively small but shallowness creates saturation (over-water) problems commonly referred to as the "perched water tables". This latter point will be discussed in detail below.

It is well known that plant roots require both oxygen and water to grow properly. In addition, the carbon dioxide and other gases produced by the plant roots and/or microbial action should be permitted to escape from the root environment since they may have a detrimental effect on root and hence total plant development. The importance of root aeration may be simply demonstrated by comparing the root growth in the ground, a clay pot, and a plastic pot. Plants growing in good topsoil in the ground will have a reasonably homogeneous distribution of roots throughout the area referred to as the root ball. Plants growing in a clay or other porous container with the same topsoil will have their roots distributed throughout the soil mass but with a somewhat greater incidence of roots occuring near the outside edges and bottom of the soil mass. Plastic pots, containing the same topsoil, because of their nonporous nature, provide a different environment for the plant root and this often results in a very large percentage of the roots near the bottom where the drainage holes provide a means for aeration.

Interpretation of the heretofore mentioned three examples is as follows: Good soil in its native habitat normally exhibits good capillarity and structure to allow for sufficient water and air (oxygen) movement (aeration) to supply plant roots. Plants grown in porous (clay-type) containers have a preponderence of roots near all surfaces of the container, namely, where there is better gas exchange. Plants grown in non-porous containers (plastic type) normally have their roots better developed in the proximity of the drainage holes, where good aeration exists. Thus in all three cases, allowing better aeration results in more root growth which in turn allows for better total plant growth and development.

However, the economics of pot manufacture suggests that if a means could be found to properly aerate a plastic pot, then such plastic pots would significantly reduce costs to nurseries. Ultimately the public would benefit from the lowered prices. Accordingly, this invention is directed toward better aeration for pots composed of nonporous materials although, the inventive concept would be useful for clay or other such porous type potting materials.

L. H. Slotzy et. al. (Hilgardia. Vol. 35, No. 20, Oct. 1964) reviewed the literature and demonstrated a relationship between $O_2$ content and its rate of replenishment in the soil and plant growth. Their work, and that of many others, can be summarized thusly: Plant roots have a critical need for oxygen and the media in which they are growing must permit a certain rate of oxygen diffusion to insure adequate or optimum growth. It follows from this fact and a knowledge of the diffusional characteristics of gases that to obtain proper oxygen diffusion, there must be an adequate number of open pores in the soil media, located a reasonable distance from the soil-air interface, and not blocked by sections containing water. It is necessary to have the diffusion of $O_2$ occur predominately through open pore spaces since the rate of $O_2$ diffusion through water is $10^4$ to $10^5$ times slower than through air. Thus, reasonably thin films or layers of water will impede the movement of oxygen sufficiently to produce less than optimum growth.

The relationship between open-pore or air filled pore space and water-filled pore space in a growing media in containers depends upon a number of factors including the composition of the media, its degree of compaction, and the physical shape of the container. This invention relates to a modified container structure to enhance air and water movement and, hence, to improve drainage and/or aeration.

Spomer has pointed out (HortScience, Vol. 9 (2) April, 1974) that container grown plants can often be repeatedly subjected to too much water or too little water. These phenomena arise because the lower portion of the media in an irrigated but drained container is often saturated with water. Furthermore, the water content decreases with height with a corresponding increase in open pores or air space. The physical basis for this non-uniform container-soil-water distribution is summarized as follows: Total soil water potential ($\psi$) can be defined as the mechanical work required to transfer a unit quantity of water from a standard reference state to the soil location being described. $\psi$ is the sum of pressure ($\psi_p$), gravitational ($\psi_g$), and osmotic ($\psi_o$) potentials. If soil water is free to move, it always moves from higher to lower $\psi$.

Container soils are shallow, often homogeneous, and open to the atmosphere at the top and often the bottom. After a container soil has been irrigated and allowed to drain, the water it retains is at static equilibrium (no water movement) and $\psi$ is constant throughout. Since the salts (cations and anions) concentration is uniform throughout, $\psi_o$ is also constant. Since drainage is into the atmosphere, $\psi_p=0$ at the drainage level and a perched water table occurs here (soil is saturated). If $\psi_g$ is set to equal 0 at this (drainage) level, then $$\psi=\psi_p+\psi_g+\psi_o$$

becomes $$\psi = 0 + 0 + \psi_o$$

and $$\psi - \psi_o = 0 = \psi_p + \psi_g \text{ or } \psi_p = -\psi_g$$

$\psi_g$ increases proportionally with height above the drainage point and must be balanced by a corresponding decrease in $\psi_p$. The decrease in $\psi_p$ with height corresponds to a decrease in water content as predicted by the soil moisture characteristics for the soil. Since the container bottom (or lowermost drainage hole) is the reference level for soil water distribution, a shallower container will have a higher average soil water content than a deeper container. This is illustrated somewhat more graphically in an article by Prof. L. Art Spomer in HortScience, Vol. 9 (2), April, 1974 at pages 152–153, but, the fact is well known.

Although it is believed that the improved growth and other advantages caused by the present invention can be explained as shown below, it is not critical to the invention that this explanation be the only or correct reason for the improvements produced by the invention.

SUMMARY OF THE INVENTION

In working with the parameters which are modifiable it became clear that the way increased growth is achieved is by minimizing the distance a molecule of gas must move from a root within the growing medium to reach a surface or container-media interface and vice versa. The interface provides a conduit or pore to oxygen and other gases from an associated drain hole since gas movement along the container-media interface is easier and faster than through the media itself. Thus, it is desirable to increase the area of media-container interface. The preferred way to increase surface area is to form a plurality of indentations or projecting means which extend into the container from the normal container side walls or bottom. This has the double beneficial effect of increasing the area of interface and decreasing the volume of saturated growing medium in the pot while maintaining maximum medium height.

It will be obvious that projections from the bottom and/or the sides can be appropriate under certain circumstances but this invention will be limited in its description to projections from the bottom wall. Such projections must be balanced by an appropriate number of aeration and drainage holes in the lower portion of the container as well as scattered throughout to insure against the perched water table mentioned above. Accordingly, the container is designed to allow water to flow by gravity from any part of the container to the openings in the lowermost part of the container. In other words, there should be no trapped or standing body of water in the container below all adjacent drainage holes. In this regard, it is advantageous to insure that lateral water and/or gas movement can occur among various container cavities.

Because the height of the projections into the container is not limited by any known physical characteristic it has been found desirable to have additional aeration and drainage holes at various locations in the side wall of the container as well as in the wall of the projection itself. The reason for the additional holes is to minimize the distance between an aeration hole and any given part of the growing media.

The container of this invention may be manufactured from any number of materials including conventional plastics of the container industry. In all such instances, it will be desirable to minimize expense in the forming or molding process by having the apertures taper inwardly from the bottom toward the top. Thereby, the prongs or ridges forming the apertures during the molding process will freely separate from the molded container when it is ejected in the usual manner.

DESCRIPTION OF THE PREFERRED EMBODIMENT

Figure 1:
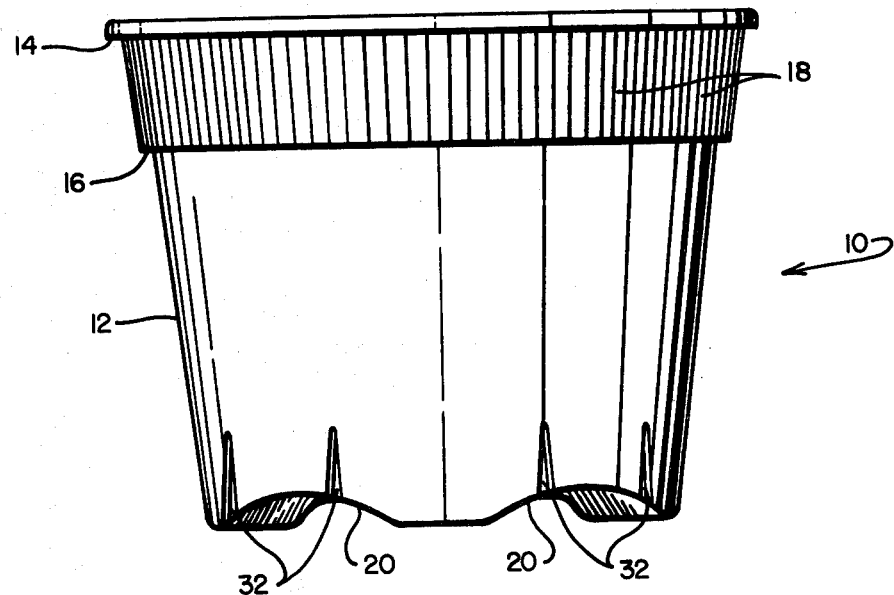
FIG. 1 is an elevational view of a container according to this invention.

The container 10 of this invention as illustrated in FIG. 1 is conventional except for the very bottom of the container. It includes a circumferentially extending, outwardly tapering side wall 12 having a radially extending lip 14 at its top and another shoulder 16 projecting radially outward about a quarter of the way down the side. Serrations 18 extend vertically in the upper portion of the container between the lip 14 and the shoulder 16.

Figure 2:
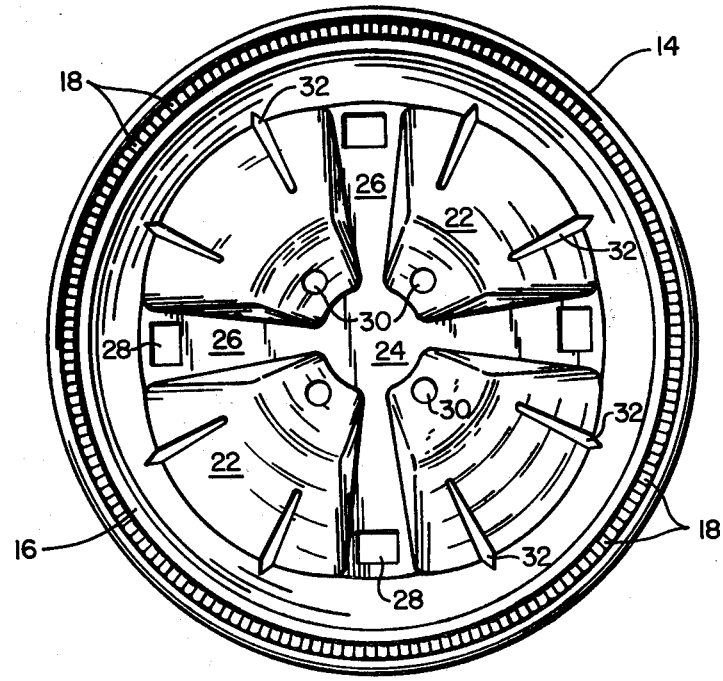
FIG. 2 is a plan view of the container of FIG. 1.
Figure 3:
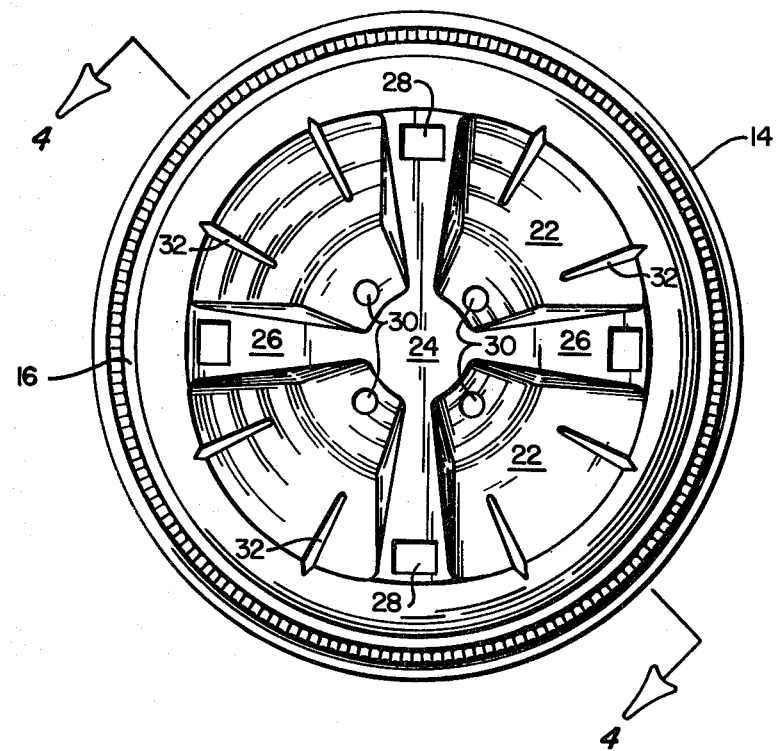
FIG. 3 is a bottom view of the container of FIG. 1.
Figure 4:
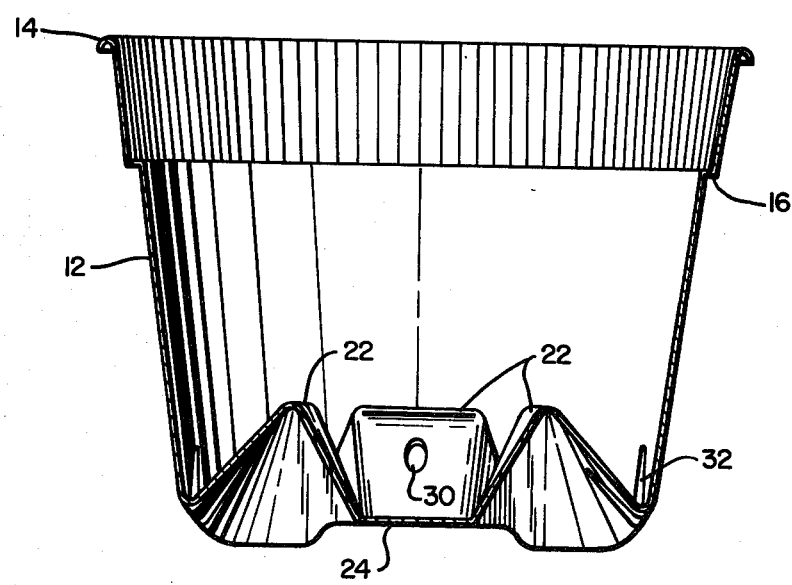
FIG. 4 is a sectional view taken along line 4—4 of FIG. 3.

It is the bottom which is completely unique. The arches 20 correspond in number to the number of upwardly extending projections or raised sections 22 in the bottom of the container. It will be observed in FIG. 4 that projections 22 extend upwardly about ⅓ the height of the container 10. These arches 20 help insure adequate gas exchange between the ambient atmosphere surrounding the container and that gas in the proximity of the inner indentations of the container. In the illustrated embodiment there are four such projections and accordingly there are four arches. Flat sections of the container bottom bridge the gaps between the projections 22 and as will be observed in FIGS. 2, 3 and 4, they merge with a slightly elevated central bottom 24. The flat sections serve as radiating passageways 26 which slope downwardly slightly from the central bottom 24 such that water at any place in the container can flow by gravity to one or more of the four apertures 28 located at the lowest elevation of the container. The reason for the apertures 28 being at the lowermost portion of the container is to insure adequate drainage of all parts of the container and thereby prevent any perched water table which would inhibit the aeration of all parts of the growing media.

The shape of the projections 22 is not of any particular significance from a mechanical standpoint. Their appearance and symmetry add to the overall appearance of the container but they could be pyramids, frustums of cones or any other shape desired. Also, as previously indicated, some of the projections could extend from the side walls as opposed to the bottom if desired. The reasons for the projections are to increase the contact area between the container and the growing media, minimize the volume of growing media often water-saturated in the given container while insuring the appropriate vertical depth for proper growing conditions and to minimize the distance a molecule of oxygen must migrate from a drainage hole within the growing media to reach a root of the growing vegetation. With this latter point in mind, it will be observed that there are twelve other apertures in the container. This includes four generally circular shaped apertures 30 formed in the side of each projection 22 facing the central bottom portion 24.

Two generally V-shaped apertures 32 are formed in the side wall and each projection and they serve to aerate and drain the valley formed between the side wall and the outer wall of the projections. It will be observed that the valleys referred to slope downward toward one aperture 28 or another such that water not draining through one of the V-shaped apertures 32 will, in fact, drain through one of the apertures 28.

The shape of apertures 32 will show a taper of said aperture from the larger part at the valley to the smaller part as the aperture progresses up the side wall 12 or up the projection 22. This tapering allows the mold forming said apertures to separate from the molded container as it is ejected following the solidifying process.

While it is not shown in the drawings because of the relative wall thickness and degree of taper, the apertures 30 and 28 similarly have a slight taper inwardly toward the top of the container to facilitate the parting of the mold and the container.

For obvious reasons the projections 22 themselves also taper or converge toward the top of the container.

Having thus described the invention, it will be clear to those having ordinary skill in the art that modifications may be made in the physical structure without departing from the spirit and scope of the inventive concept. Accordingly, it is not intended that the particular illustrated embodiments nor the language used to describe the invention be limiting on the invention itself. Rather, it is intended that the invention be limited only to the appended claims.

What is claimed is:

1. A container adapted for holding a growing media suitable for plants comprising:
    a bottom wall connected to a circumferentially extending side wall which together define an open topped container having an inside surface and an outside surface;
    an outwardly projecting lip at the open top and a shoulder projecting outwardly from said side wall intermediate the bottom and the lip;
    said bottom wall including four raised sections projecting symmetrically upwardly into said container about ⅓ the height thereof around a central bottom portion, each raised section tapering inwardly toward the top of the container, the central bottom portion being free of raised sections;
    a plurality of first drainage holes extending through the lowermost portion of said bottom wall;
    at least one other drainage hole projecting through each raised section to minimize the distance from a drainage hole to parts of the media;
    arched air passageways in the exterior bottom surface of the container in communication with the drainage holes in the raised sections, the number of arched passageways corresponding to the number of raised sections, each arched passageway extending from the side wall to the center of the container bottom and between two of said first drainage holes;
    four radially extending passageways, each passageway extending between two raised sections and sloping downward from the central bottom portion to one of said first drainage holes; and
    additional drainage holes, each additional hole extending through both the side wall at an arched passageway and the associated raised section.

2. The container of claim 1 wherein each said hole tapers inwardly toward the open top of said container.

* * * * *